United States Patent
Aoki et al.

(10) Patent No.: US 7,057,342 B2
(45) Date of Patent: Jun. 6, 2006

(54) PLASMA DISPLAY PANEL AND PRODUCTION METHOD THEREFOR

(75) Inventors: Masaki Aoki, Mino (JP); Hiroyuki Yonehara, Hirakata (JP); Morio Fujitani, Kadoma (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 172 days.

(21) Appl. No.: 10/481,801

(22) PCT Filed: Jul. 2, 2002

(86) PCT No.: PCT/JP02/06666

§ 371 (c)(1),
(2), (4) Date: Jul. 19, 2004

(87) PCT Pub. No.: WO03/005401

PCT Pub. Date: Jan. 16, 2003

(65) Prior Publication Data

US 2004/0246204 A1    Dec. 9, 2004

(30) Foreign Application Priority Data

Jul. 3, 2001    (JP) .............................. 2001-201629

(51) Int. Cl.
*H01J 17/00*    (2006.01)

(52) U.S. Cl. ........................ 313/583; 313/582; 313/586
(58) Field of Classification Search ......... 313/582–586
See application file for complete search history.

(56) References Cited

U.S. PATENT DOCUMENTS 6,184,163 B1    2/2001    Lee et al.
6,599,851 B1    7/2003    Ryu

FOREIGN PATENT DOCUMENTS

| JP | 9-278482 | 10/1997 |
| JP | 11-297217 | 10/1999 |
| JP | 2000-226231 | 8/2000 |
| JP | 2000-313635 | 11/2000 |
| JP | 2001-2447 | 1/2001 |
| JP | 2001-89187 | 4/2001 |

*Primary Examiner*—Vip Patel

(57) ABSTRACT

A plasma display panel capable of restricting the yellowing of a dielectric layer and the occurrence of dielectric breakdown, wherein glass constituting a dielectric layer uses glass containing a metal oxide $MO_2$ capable of a trivalent or tetravalent-ion formation in glass. Accordingly, even when Ag is ionized from an electrode consisting essentially of Ag to diffuse to a dielectric layer, Ag does not aggregate to be formed into a colloid with an ionized state kept. Therefore, yellowing and dielectric breakdown caused by Ag turning to colloid can be restricted.

22 Claims, 4 Drawing Sheets

PLASMA DISPLAY PANEL AND PRODUCTION METHOD THEREFOR

TECHNICAL FIELD

The present invention relates to a plasma display panel used for image display for a computer or television or the like.

BACKGROUND ART

In the field of display devices used for image display, represented by CRT displays (CRT), liquid crystal displays (LCD), and plasma display panels, much has been expected in recent years of large high-definition screens such as high vision television screens.

CRTs, which are the most widely used among these display devices, are superior with regard to resolution and image quality, however are not suitable as devices for large screens of 40 inches or more due to their weight and depth. On the other hand, although LCDs have superior properties of low power consumption, and low driving voltage, the production of large screen LCDs is difficult, and LCDs have limited viewing angles. Compared with these devices, as well as PDPs having a wide viewing angle range, the production of large screen PDPs with shallow depth is relatively simple, and developments have already been made in 40 inch class products (for example, *Kinouzairyou* (*Function & Materials*) February 1996, volume 16, page 27).

A PDP is a type of gas discharge panel, and generally has a construction in which a front glass substrate and a back glass substrate are arranged facing each other via barrier ribs.

A plurality of conductive metal electrodes made of Ag and Cr/Cu/Cr and the like are arranged in parallel lines on the surface of the front glass substrate which faces the back substrate, and a dielectric layer which covers and insulates the metal electrodes, is formed, which is then covered with a protective layer made of MgO or the like. Also, on the surface of the back glass substrate which faces the front substrate, a plurality of metal electrodes are arranged in parallel lines, a dielectric layer is formed covering the electrodes, and, further, as well as barrier ribs being aligned on the dielectric layer, phosphor layers are applied onto the dielectric layer between the barrier ribs. A discharge gas, which includes rare gas or the like, is enclosed between the front glass substrate and the back glass substrate. When driving the PDP, ultraviolet light is emitted by the enclosed discharge gas as a result of applying a pulse voltage to the pairs of electrodes formed on the front glass substrate, and the ultraviolet light causes the phosphor layers provided on the back glass substrate to excite and irradiate. The light irradiated from the phosphor layers passes through the dielectric layer and the front glass substrate and the like, and is visible to a user. Here, the dielectric layer formed on the front glass substrate is generally constructed from glass having a low fusion point, the properties of such glass including high transparency, a baking temperature of 500–600° C., and sufficient voltage resistance.

Conventionally, Pbo or $Bi_2O_3$ glasses which have sufficient voltage resistance have been used as dielectric layers. However, as the relative permittivities of these glasses were high at 10–12, there was a tendency for a large amount of current to flow during discharge, and subsequently power consumption of the PDP tended to increase.

Therefore, the use of $SiO_2$, which has a comparatively low relative permittivity, as the dielectric layer was considered. However, because an $SiO_2$ film is formed by an evaporating method or a spattering method, as well as forming the film to the required thickness (20–30 μm) being difficult, the formed film was easily cracked, as it was difficult to insure a sufficient pressure resistance.

Meanwhile, $Na_2O$—$B_2O_3$—$SiO_2$ glasses and $Na_2O$—$B_2O_3$—$ZnO$ glasses which do not include the abovementioned PbO, $Bi_2O_3$ and the like, and have relative permittivities which are lower than for conventional glass, and softening points of 500–600° C. are being developed for use as the dielectric layer (for example, as mentioned in Japanese Laid-Open Patent Publication No. 9-199037 and Laid Open Patent Publication No. 9-278482). These glasses include alkali metal oxide components such as $Na_2O$ (sodium oxide), $K_2O$ (potassium oxide), $Li_2O$ (lithium oxide) to lower the glass softening point, and because the glass softening point is lowered due to the inclusion of such components, baking of the dielectric layer can be performed at a comparatively low temperature.

However, when this kind of glass, which includes a component which lowers the softening point, is used in a dielectric layer there is a possibility that yellowing will occur on the dielectric layer, front glass substrate and the like. The mechanism which causes such yellowing is considered as follows.

Display electrodes provided on the front glass substrate are made using Ag, Cu or the like, and there are cases where, at the time of baking which is performed to form the dielectric layer, Ag, Cu or the like ionizes and starts to melt and diffuse into the dielectric layer, the front glass substrate and the like. The diffused Ag and Cu ions, which are easily deoxidized by alkali metal ions such as Na ions which are ionized by the component which lowers the softening point, and Sn ions (valency 2) which are included in the front glass substrate, become colloid in such a case. When Ag and Cu have become colloid, the dielectric layer and the front glass are stained yellow or brown, that is to say, yellowing occurs (for example, J. E. SHELBY and J. VITKO Jr Journal of Non Crystalline Solides vol50 (1982) 107–117). In PDP, because such stained glass absorbs light with a wavelength of 400 nm, problems such as decreased blue color brightness and deterioration in chromaticity occur. Further, as Ag and Cu colloids and the like are conductive, they reduce the dielectric resistance of the dielectric layer, and as the colloids are formed from deposits of colloid particles which are far larger than ions, the Ag and Cu colloids are the cause of a reflection of light which should pass through the dielectric layer, which consequently reduces PDP brightness.

In order to restrict this kind of reduction in dielectric resistance and yellowing of the dielectric layer, a possible method is to construct a double-layered dielectric layer by using PbO glass, which does not include a component which lowers the softening point of the glass, to encase the parts of the dielectric layer which are in direct contact with the display electrodes, and then laminate the PbO glass with low-permittivity $Na_2O$—$B_2O_3$—$SiO_2$ glass. However this method is not desirable as it increases the number of construction processes for the dielectric layer, therefore increasing construction cost. Further, from an environmental conservation viewpoint, there is also a demand for a construction method which does not use lead (Pb).

In view of the abovementioned problems, the object of the present invention is to provide a highly reliable plasma display panel that includes a dielectric layer which, in order to lower permittivity, does not include PbO, and in which yellowing of the front glass substrate, the dielectric layer and the like is restricted, and dielectric breakdown does not occur; and a production method for the PDP.

DISCLOSURE OF THE INVENTION

In order to achieve the abovementioned aims, the plasma display panel of the present invention comprises metal electrodes and a dielectric layer which covers the metal electrodes, the dielectric layer being composed of glass formed from zinc oxide, boron oxide, silicon oxide, $R_2O$ and $MO_2$, wherein the $R_2O$ is one material selected from a group consisting of lithium oxide, sodium oxide, potassium oxide, rubidium oxide, cesium oxide, copper oxide and silver oxide, and $MO_2$ is one or more materials selected from the group consisting of manganese (IV) oxide, cerium (IV) oxide, tin (IV) oxide, and antimony (IV) oxide.

With this choice of materials, even when silver and copper, which are generally used for metal electrons, have ionized and diffused into the dielectric layer and front glass substrate, they can be maintained in their ionized states. Accordingly, because the aggregation of the silver and copper to form a colloid state can be restricted, the yellowing of the dielectric layer and front glass substrate, as well as dielectric breakdown, which are caused by the formation of the colloid, can be restricted.

Here, the use of alkali metal oxide $R_2O$ can improve the pressure resistance of the dielectric layer as well as lower the softening point of the glass. Due to the addition of the alkali metal oxide $R_2O$ to the glass, because the surface tension of the glass is lowered and fluidity is increased when the glass is melted, the pressure resistance of the dielectric layer is increased, and the incidence of pinholes and cracks in the dielectric layer is restricted. However, the alkali metal oxide $R_2O$, which is a component that lowers the melting-point of the glass, also accelerates yellowing, and causes yellowing to intensify when the amount of $R_2O$ included in the glass exceeds 10% by weight, therefore it is preferable to limit the amount of $R_2O$ to 10% by weight or less.

However, when using a glass with a composition which has 10% by weight or less of $R_2O$, if $MO_2$ is not included in the composition, although yellowing of the dielectric layer will not be noticeably visible (a b* value, which shows the yellowing of glass, is approximately 5), yellowing does actually occur, and color temperature in the PDP is significantly lowered, leading to reduction in display image quality.

Therefore, by using a glass which also includes $MO_2$ for the dielectric layer, the occurrence of yellowing can be restricted, while maintaining high pressure resistance and restricting dielectric breakdown.

Accordingly, a plasma display panel and production method therefor, including a highly reliable dielectric layer that is capable of restricting yellowing of the front glass substrate and the dielectric layer itself, in which dielectric breakdown does not occur, wherein the dielectric layer is made up of $P_2O_5$ glass or ZnO glass which includes an alkali metal oxide ($R_2O$) to increase pressure-resistance, and does not include PbO, $B_2iO_3$ and the like which lower permittivity, can be provided.

Further, it is confirmed that the occurrence of yellowing and dielectric breakdown in PDP can be restricted if the specific composition ratio of the glass which constructs the dielectric layer is zinc oxide: 35–44% by weight, boron oxide: 35–55% by weight, silicon oxide: 5–15% by weight, $R_2O$: 1–5% by weight, and $MO_2$: 0.5%–10% by weight.

Further, a glass that further includes aluminum oxide can be used for the dielectric layer. The inclusion of aluminum oxide in the glass functions to restrict the occurrence of split-phase in the dielectric layer.

Specifically, it is confirmed that the occurrence of yellowing and dielectric breakdown in PDP can be restricted when the composition ratio of the glass which constructs the dielectric layer is zinc oxide: 20–43% by weight, boron oxide: 38–55% by weight, silicon oxide: 5–17% by weight, aluminum oxide: 1–10% by weight, $R_2O$: 1–5% by weight, and $MO_2$: 0.2%–5% by weight.

Further, a glass which further includes phosphorus oxide (V) can be used for the dielectric layer.

Specifically, the occurrence of yellowing and dielectric breakdown in PDP can be restricted when the composition ratio of the glass of the dielectric layer is zinc oxide: 20–35% by weight, boron oxide: 30–55% by weight, silicon oxide: 5–12% by weight, phosphorus oxide (V): 15–25% by weight, $R_2O$: 0.1–5% by weight, and $MO_2$: 0.5–10% by weight.

Further, it is confirmed that the occurrence of yellowing and dielectric breakdown in PDP can be restricted when $R_2O$ is potassium oxide, and the composition ratio of the glass which constructs the dielectric layer is zinc oxide: 10–25.5% by weight, boron oxide: 20–40% by weight, silicon oxide: 10–30% by weight, aluminum oxide: 5–25% by weight, potassium oxide: 3–10% by weight, and $MO_2$: 0.5–5% by weight.

Further, the occurrence of yellowing and dielectric breakdown in PDP can be restricted when $R_2O$ is lithium oxide, and the composition ratio of the glass which constructs the dielectric layer is zinc oxide: 10–19% by weight, boron oxide: 20–40% by weight, silicon oxide: 10–30% by weight, aluminum oxide: 5–25% by weight, lithium oxide: 3–10% by weight, and $MO_2$: 1–5% by weight.

Further, the dielectric layer can be constructed from a $ZnO$—$B_2O_3$—$SiO_2$—$Al_2O_3$—$R_2O$ glass, a $P_2O_5$—$ZnO$—$B_2O_3$—$SiO_2$—$R_2O$ glass, or a $ZnO$—$B_2O_3$—$SiO_2$-MO-$R_2O$ glass, (M is one or more materials selected from the group consisting of Mg, Ca, Sr, and Ba) which includes 0.5–5% by weight of the metal oxide $MO_2$ capable of trivalent or tetravalent ion configuration in glass, no more than 10% by weight of the alkali metal oxide $R_2O$, and does not include PbO or $B_2O_3$ ($R_2O$: R is one material selected from the group consisting of Li, K, Na, Cu, Ag, Cs, and Rb).

In particular, the use of silver electrodes, or chrome/copper/chrome electrodes as the metal electrodes is highly effective for the prevention of yellowing and the restriction of dielectric breakdown.

BEST MODE FOR CARRYING OUT THE INVENTION

One embodiment of the PDP of the present invention is explained below with reference to the drawings. The aim of the preferred embodiment, and the drawings of the invention of the present application which are shown below, is to show examples, and the present invention is not limited to these.

(Construction of PDP)

First, the construction of PDP will be explained.

Figure 1:
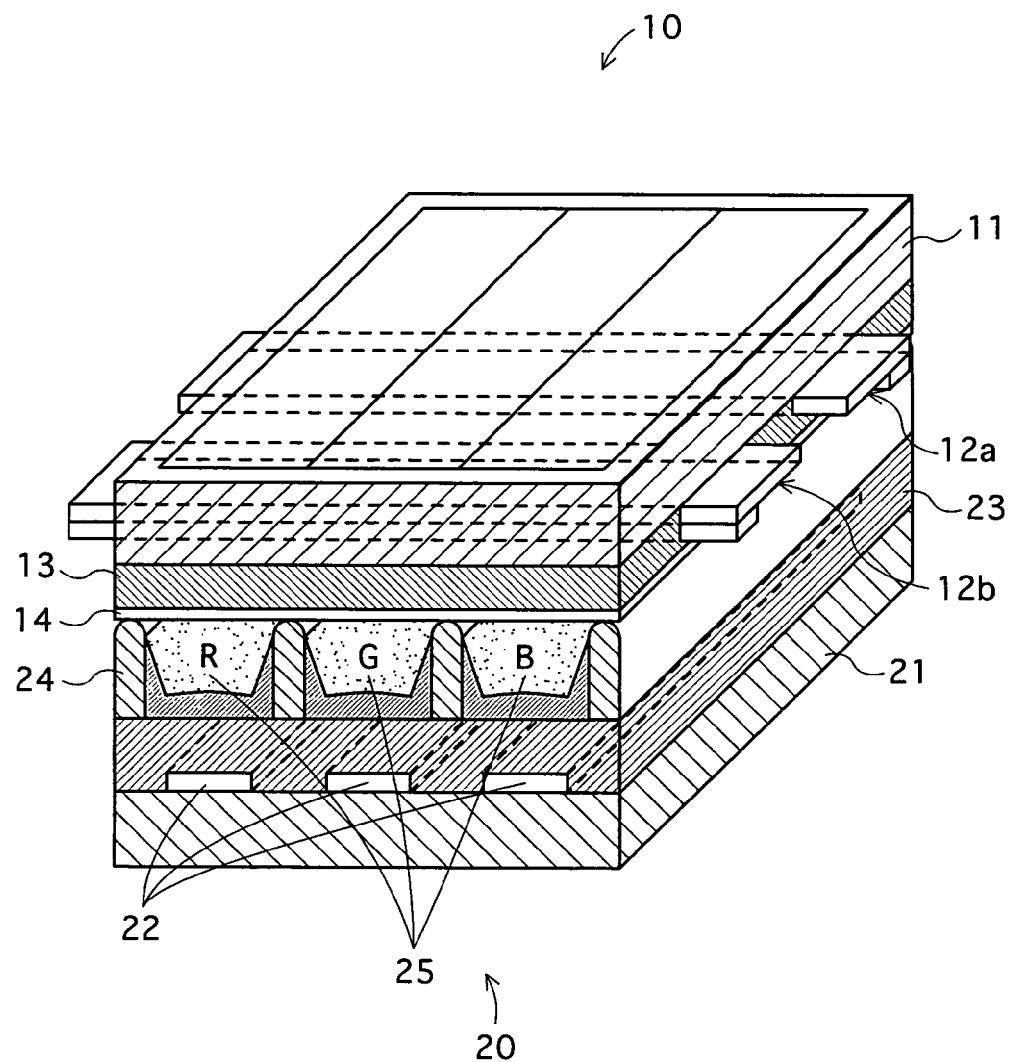
FIG. 1 is a perspective drawing of a relevant part of a PDP.
Figure 2:
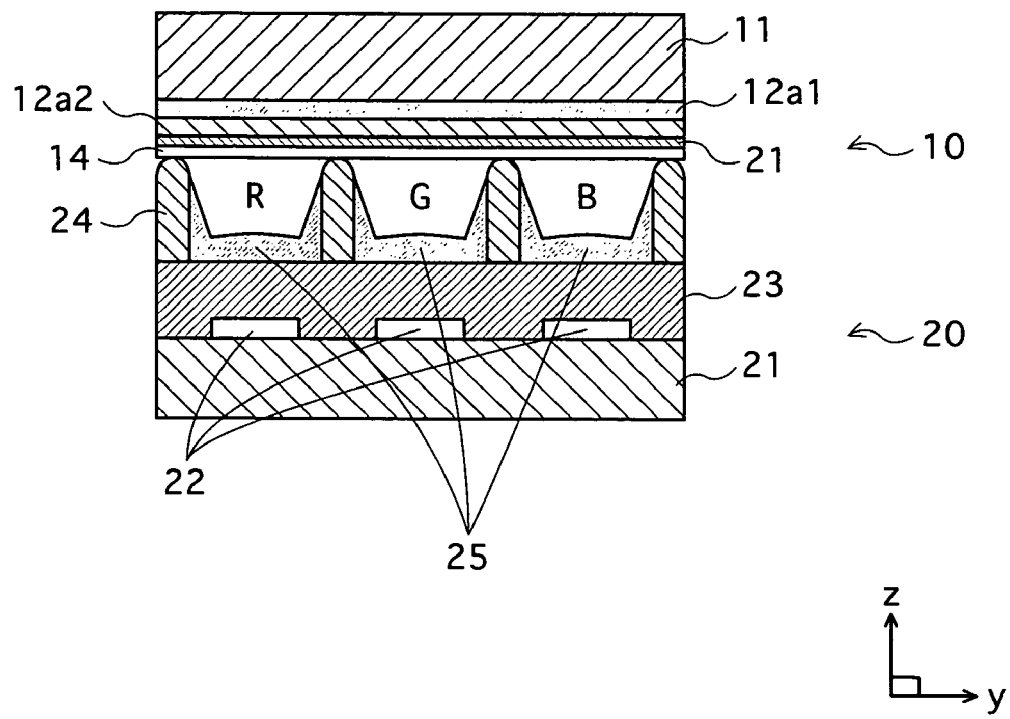
FIG. 2 is a side cross-sectional drawing of the PDP of FIG. 1 viewed along an x axis.
Figure 3:
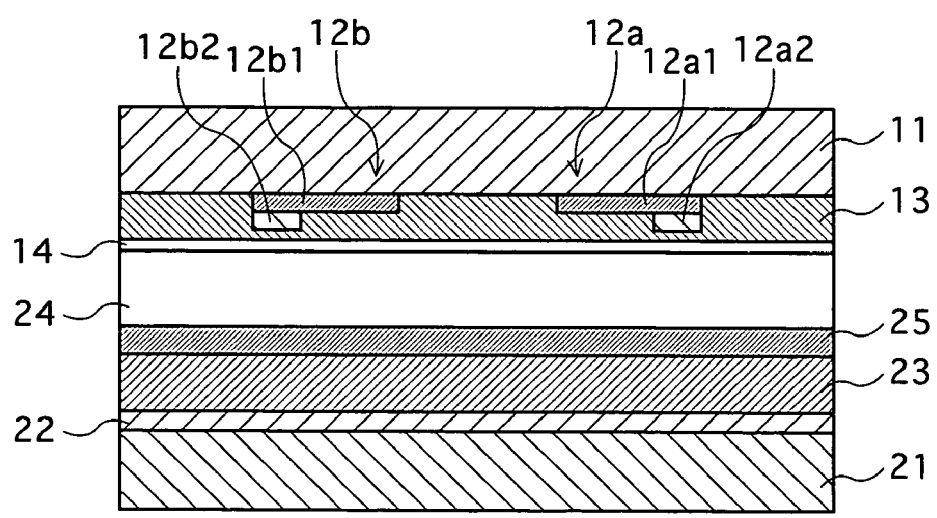
FIG. 3 is a side cross-sectional drawing of the PDP of FIG. 1 viewed along a y axis.
Figure 3:
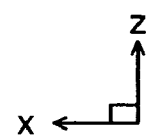

FIG. 1 is a perspective drawing of a part of the (AC) PDP of the present embodiment, FIG. 2 is a cross-sectional drawing of the PDP of FIG. 1 viewed along an x axis, and FIG. 3 is a cross-sectional drawing of the PDP of FIG. 1 viewed along a y axis.

As shown in FIG. 1, the PDP has a construction which includes a front panel 10, a back panel 20, and a front glass substrate 11 in the front panel 10, and a back glass substrate 21 in the back panel 20 which are arranged parallel to each other by barrier ribs 24 and the like. The periphery of the substrates 11, 12 are sealed together by flit glass (not shown in the drawing) or the like.

As shown in FIG. 1 and FIG. 3, a scan electrode 12a and a sustain electrode 12b are formed parallel to each other on the surface of the front panel 10 that faces the back panel, a dielectric layer 13 which covers the electrodes 12a and 12b is applied to the front panel 10, and a protective layer 14 covers the dielectric layer 13. FIG. 1 and FIG. 3 illustrate only one pair of electrodes, consisting of the scanning electrode 12a and the sustaining electrode 12b, however there are actually a plurality of pairs of scanning electrodes 12a and sustaining electrodes 12b provided on the front panel 10.

The front glass substrate 11 is made of sodium borosilicate glass formed using a float method.

As shown in FIG. 3, the scan electrode 12a and sustain electrode 12b are made up of transparent electrodes 12a1 and 12b1 respectively, which are made of ITO, SnO2 or the like, and part of each of the electrodes 12a1 and 12a2 are laminated with metal electrodes 12a2 and 12b2 respectively, which are made of Ag or Cr/Cu/Cr, or the like and serve the function of a bus line. Here, the scan electrode 12a and sustain electrode 12b include the transparent electrodes 12a1 and 12b1, however a construction may be used where each of the electrodes 12a and 12b are made only of metal electrodes 12a2 and 12b2, without transparent electrodes.

The dielectric layer 13 is a layer of dielectric glass having a 15–40 μm film thickness, and has a function of insulating both the scan electrode 12a and the sustain electrode 12b.

The protective layer 14 is a layer made of magnesium oxide (MgO), and has a function of protecting the dielectric layer 13 from sputtering due to discharge which occurs during PDP driving.

The back panel 20, as shown in FIG. 1 and FIG. 2, includes the back glass substrate 21, address electrodes 22 arranged in a stripe formation onto the back glass substrate, the dielectric layer 23 which covers the address electrodes 22, barrier ribs 24 which are arranged parallel to the address electrodes 22 on the dielectric layer 23, and phosphor layers 25 of colors red, green and blue which the dielectric layer is coated in each of the spaces between the barrier ribs 24.

In the gap between the front glass substrate 11 and the back glass substrate 21, a discharge space 30 is formed which is divided up into 100–200 μm intervals by the barrier ribs 24, and this is where discharge gas made up of Ne—Xe and the like is enclosed.

When driving the PDP, by applying a voltage which is no less than a gas discharge initialization voltage to both the scan electrode 12a on the front panel 10, and the address electrodes 22 on the back panel 20, discharge is caused near the surface of the protective layer 14 of the front panel 10. Here, the gas discharge initialization voltage varies according to the distance between the scan electrode 12a and the address electrodes 22, the type and pressure of discharge gas, and the thickness of the dielectric layers 13 and 23 and the protective layer 14. When discharge occurs near the surface of the protective layer 14, positive ions and electrons and the like are generated by ionization, and the generated positive ions, electrons and the like move towards both the scan electrode 12a and the sustain electrode 12b which have poles and anti-poles. This causes the surface of the protective layer 14, made of MgO which has high resistance, to be electrically charged, however because the resistance of the MgO layer is high, the charge does not decrease, and what can be called a barrier charge forms on the protective layer 14. Because both the voltage to be applied to the scan electrode and sustain electrode, and an electric field with a negative polarity are created within the discharge space by the barrier charge, the electric field in the discharge space is weakened and the discharge soon stops.

Next, discharge is started and sustained by applying a discharge sustaining pulse to both the scan electrode 12a and the sustain electrode 12b. Here, because discharge occurs easily in the discharge space due to the barrier charge, the voltage of the discharge sustain pulse may be a voltage equal to or less than the gas discharge initialization voltage. Discharge of gas is intermittently sustained by the application of the abovementioned discharge sustain pulses, and ultra-violet light is generated from the discharged gas. The ultra-violet light excites the phosphor layer 25 of the back panel 20, causing the phosphor layer to emit light, the emitted light penetrates front panel 10, and an image is displayed by the PDP.

(Composition of the Dielectric Layer 13)

The characteristic point of the present invention is the discovery of a dielectric layer composition with which yellowing of the front glass substrate and the dielectric layer 13 can be restricted.

For instance, $ZnO—B_2O_3—SiO_2—Al_2O_3—R_2O\text{-}MO_2$ dielectric glass, $ZnO—B_2O_3—SiO_2—R_2O\text{-}MO_2$ dielectric glass, $P_2O_5—ZnO—B_2O_3—SiO_2—R_2O\text{-}MO_2$ dielectric glass, and $ZnO—B_2O_3—SiO_2—CuO—R_2O\text{-}MO_2$ dielectric glass can be given as examples of dielectric glasses which are used as the dielectric layer 13. $MO_2$, which is included in each of the above glasses, is one or more materials selected from a group consisting of $MnO_2$, $CeO_2$, $SnO_2$, and $SbO_2$, and $R_2O$ is one material selected from a group consisting of $Li_2O$, $Na_2O$, $K_2O$, $Rb_2O$, $Cs_2O$, $Cu_2O$, and $Ag_2O$.

These dielectric glasses include the oxide $MO_2$ of the metal M (M is one or more materials selected from the group consisting of Mn, Ce, Sn, and Sb), which is capable of trivalent or tetravalent ion configuration in glass.

Here, if the metal oxide $MO_2$ which is capable of trivalent or tetravalent ion configuration is included in the dielectric glass, even once Ag ions and Cu ions from the scan electrode 12a and the sustain electrode 12b are diffused and deoxidized in the dielectric layer, the trivalent and tetravalent metal ions are able to return $Ag^+$ and $Cu^{2+}$ to their ion state by taking Ag and Cu electrons from the deoxidized Ag and Cu, because the trivalent and tetravalent metal ions are deoxidized by the divalent metal ions. Therefore, it is considered that in the dielectric layer 13, Ag and Cu are kept in an ionized state, and colloid aggregation of Ag and Cu which have diffused from electrodes 12a and 12b, is restricted. As a result of this, as well as yellowing of the dielectric layer 13 being restricted, dielectric breakdown does not occur. Furthermore, because it is considered that the metal oxide included in the dielectric layer 13 usually also diffuses into the front glass substrate 11 to which the dielectric layer is applied, the occurrence of yellowing is also restricted in the front glass substrate 11.

As a specific composition, for a $ZnO$—$B_2O_3$—$SiO_2$—$Al_2O_3$—$R_2O$-$MO_2$ dielectric glass, a mixture having ZnO 20–43% by weight, $B_2O_3$ 38–55% by weight, $SiO_2$ 5–17% by weight, $Al_2O_3$ 1–10% by weight, $R_2O$ 1–5% by weight, and $MO_2$ 0.5–5% by weight can be used.

Or, for a $ZnO$—$B_2O_3$—$SiO_2$—$R_2O$-$MO_2$ dielectric glass, a mixture having ZnO 35–44% by weight, $B_2O_3$ 35–55% by weight, $SiO_2$ 5–15% by weight, $R_2O$ 1–5% by weight, and $MO_2$ 0.5–10% by weight can be used.

For a $P_2O_5$—$ZnO$—$B_2O_3$—$SiO_2$—$R_2O$-$MO_2$ dielectric glass, a mixture having $P_2O_5$ 15–25% by weight, ZnO 20–35% by weight, $B_2O_3$ 30–55% by weight, $SiO_2$ 5–12% by weight, $R_2O$ 0.1–5% by weight, and $MO_2$ 0.5–10% by weight can be used.

For a $ZnO$—$B_2O_3$—$SiO_2$—$CuO$—$R_2O$-$MO_2$ dielectric glass, a mixture having ZnO 35–45% by weight, $B_2O_3$ 20–35% by weight, $SiO_2$ 5–20% by weight, CuO 0.1–5% by weight, $R_2O$ 0.1–5% by weight, and $MO_2$ 0.5–10% by weight can be used.

Here, ZnO has a function of lowering the thermal expansion coefficient without significantly raising the glass softening point. $B_2O_3$, the main component in the glass, also has a function of lowering the glass softening point, and when the $B_2O_3$ content exceeds 55% by weight, the glass split-phases and the transparency of the glass is easily reduced. $SiO_2$ is essential to glass construction, glass formation being difficult when the $SiO_2$ content is less than 5% by weight, and the glass softening point being too high when $SiO_2$ content exceeds 20% by weight. $Al_2O_3$ has a property of restricting the split-phasing of glass, and when the $Al_2O_3$ content exceeds 10% by weight, crystallization occurs in the glass, lowering the glass transparency. $R_2O$ has properties of lowering the glass softening point and improving the glass fluidity during melting, and, because the glass pressure resistance decreases and the thermal expansion coefficient increases when the $R_2O$ content exceeds 10% by weight, an $R_2O$ content in a range of 1–5% by weight is preferable. $MO_2$ has a property of preventing panel yellowing, and $MO_2$ content of 0.5%–10% by weight is preferable. This is preferable because when $MO_2$ content is less than 0.5% it is unable to prevent yellowing, and when $MO_2$ content exceeds 10%, the glass is stained.

Dielectric glass which has each of the above compositions has a permittivity of 6–7 which is low when compared with lead oxide (PbO) glass, bismuth oxide ($Bi_2O_3$) glass and the like (which have permittivities in a range of 10–13). Therefore, by using the dielectric glass having the above compositions as a PDP dielectric layer, the amount of electric current flowing at the driving time can be reduced, thus power consumption can be restricted. Also, because a metal oxide $MO_2$ which is capable of trivalent or tetravalent ion configuration is included in the dielectric layer, yellowing of the panel can be restricted. Further, as well as including $R_2O$ which restricts the incidence of pin holes and cracks in the dielectric layer, $MO_2$, which can restrict colloid formation of the dielectrics silver and copper in the dielectric-layer, is included, so dielectric breakdown will not occur. Dielectric breakdown is considered not to occur in both the front panel 10 and the back panel 20, because the dielectric layer 23 of the back panel 20 uses dielectric glass of the same composition as the dielectric layer in the front panel. Further, including $R_2O$ in the ZnO glass of the present application rather than in conventional PbO glass is confirmed to be remarkably effective in improving the pressure resistance of the dielectric layer.

Furthermore, it is considered that an effect similar to that in the present embodiment can be achieved for the same reasons as above, even when the metal oxide $MO_2$, which is capable of trivalent or tetravalent ion configuration is combined with a $ZnO$—$B_2O_3$—$SiO_2$—$Al_2O_3$—$R_2O$ glass, a $P_2O_5$—$ZnO$—$B_2O_3$—$SiO_2$—$R_2O$ glass, or a $ZnO$—$B_2O_3$—$SiO_2$-MO-$R_2O$ glass, which does not contain PbO or $Bi_2O_3$, and has no greater than 10% $R_2O$ alkali metal oxide content, ($R_2O$: R being one of Li, K, Na, Cu, Ag, Cs, and Rb), (with the condition that M is one of, or at least 2 of Mg, Ca, Sr, and Ba). In this case, the preferable amount of $MO_2$ added to the glass is in a range of 0.5–5% by weight. This is preferable because when the $MO_2$ content is less than 0.5% by weight, it is not effective in restricting yellowing, however when $MO_2$ content exceeds 5% by weight, the glass is stained.

(Production Method of PDP)

<Formation of the Front Panel 10>

The front panel 10 is formed by a process of forming the scan electrodes 12a and the sustain electrodes 12b on the front glass substrate 11, then covering the front glass substrate and formed electrodes with the dielectric layer 13 using dielectric glass powder having the abovementioned composition, and covering the dielectric layer with the protective layer 14.

(1) Formation of Scan Electrodes 12a and Sustain Electrodes 12b

A formation method for the scan electrodes 12a and the sustain electrodes 12b will be explained using FIGS. 4A to 4H.

FIG. 4A–FIG. 4H are cross-sectional drawings of the front glass substrate 11 during each process of the formation of the scan electrodes 12a and the sustain electrodes 12b on the glass substrate 11.

Figure 4A:
FIGS. 4A to 4H are side cross-sectional drawings of the front panel in each production process.

First, as is shown in FIG. 4A, the front glass substrate 11 is prepared.

Figure 4B:

Next, as is shown in FIG. 4B, one surface of the front glass substrate 11 is covered with a film of ITO (a transparent dielectric consisting of indium oxide and tin oxide) using a sputtering method, until the film thickness reaches 0.12 μm.

Figure 4C:
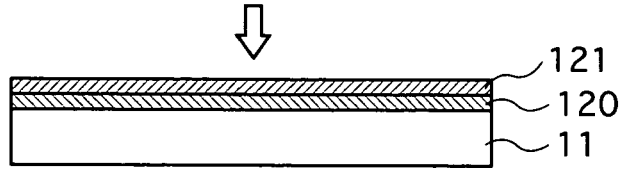
Figure 4D:
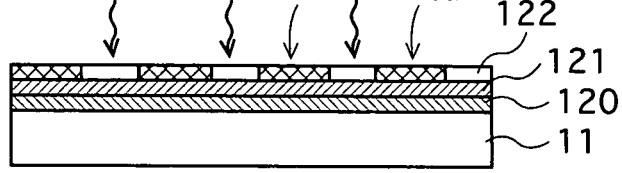
Figure 4E:
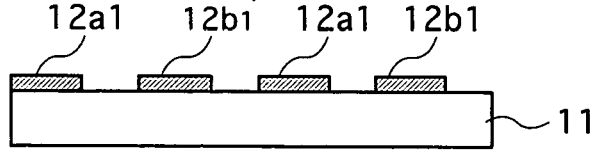

Next, as shown in FIG. 4C, a photoresistant layer is formed on the ITO film. Then, as shown in FIG. 4D, the photoresistant layer 121 is covered using a mask 122 that has holes 122a, which are the same shape as the electrodes, and exposed to light. Due to this exposure, the parts of the photoresistant layer 121 corresponding to the holes 122a of the mask 122 solidify, though the other parts of the photoresistant layer are unchanged. Then, by developing the photoresistant layer in a developing fluid, the unsolidified parts of the photoresistant layer and are washed away. After that, as shown in FIG. 4E, by performing sandblasting and etching, the parts of the ITO film which are washed away are removed, and each of the transparent electrodes 12a2 and 12b2 are formed on the scan electrodes 12a and sustain electrodes 12b respectively. Note that the distance between transparent electrodes 12a and transparent electrodes 12b is 0.08 mm so as to suit a 40-inch class PDP. Also, as an alternative to forming transparent electrodes using a photolithograph method such as used here, electrodes can be formed using a laser processing method.

Figure 4F:
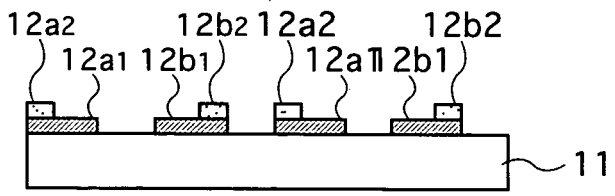

Next, after a photosensitive silver paste has been appplied onto the front surface of the transparent electrodes, Ag bus line electrodes with 40 μm width are formed using the photolithograph method which is described above. Then, as shown in FIG. 4F, scan electrodes 12a and sustain electrodes 12b are formed by baking at a temperature of approximately 550° C.

(2) Formation of Dielectric Layer 13 and Protective Layer 14

Figure 4G:
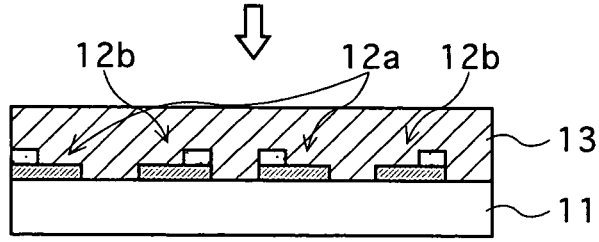
Figure 4H:
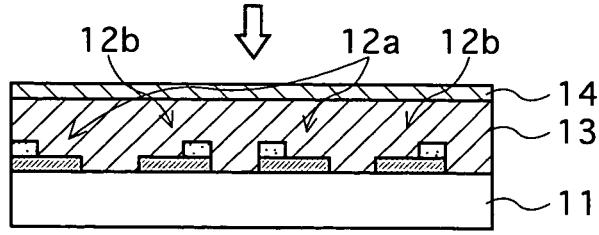

Next, as shown in FIG. 4G, a dielectric glass paste is applied onto the front glass substrate 11 on which electrodes 12a and 12b are formed.

The dielectric glass paste is formed as follows.

First, dielectric glass having the previously mentioned composition is crushed using a jet mill so that the average particle size is 0.5–2.5 μm, to form dielectric glass powder. Next, a solution including the dielectric glass powder 35%–70% by weight, ethyl cellulose, ethylene oxide resin or acrylic resin 1–20% by weight, and, as a binder, turpineol, butyl carbitol acetate, or pentanediol 30–65% by weight is formed and mixed using a tripodal roll or a homonizer. By adding 0.1–10% by weight, relative to the binder, of dioctyl phthalate, dibutyl phthalate, or glycerine to the mixture as aplasticizer, and glycerol mono oleate, sorbitan sesquioleate or homogenol (produced by Kao Corporation) or the like, to the mixture as a dispersant, sedimentation of the glass powder within the paste can be prevented.

After drying the dielectric glass paste which has been applied as describe above, by baking the paste at a temperature of 500–600° C., as well as the organic components such as the binder components being dissolved, the dielectric glass powder is softened and dissolved. By cooling the baked mixture, the dielectric layer 13 is formed.

Next, the protective layer 14 made of magnesium oxide is formed on the surface of the dielectric layer 13. In the present embodiment, the protective layer 14 (thickness 1.0 μm), which is made of highly sputter-resistant MgO having (100) face or (110) face orientation, is formed using a CVD method (such as thermal CVD method or plasma CVD method). Further, instead of a CVD method, an ion plating method or vacuum evaporation method can also be used.

<Construction of the Back Panel 20>

First, the address electrodes 22 are formed on the back glass substrate 21 using a lift off method. Specifically, after the surface of the back glass substrate 21 is covered with the photoresistant layer, and the photoresistant layer has been solidified using the mask which covers the parts of the back glass substrate 11 on which address electrodes 22 are to be formed, indentations are formed in the parts of the photoresistant layer where address electrodes are to be formed, by developing. After silver paste is applied onto the whole surface of the photoresistant layer and solidified, the photoresistant layer is stripped from the back glass substrate 11. By this process, the address electrodes 22 are formed on parts of the back glass substrate 11 which correspond to the indentations in the photoresistant layer.

The dielectric layer 23 is formed on the back glass substrate 21 on which address electrodes 22 are formed, using the same method as for the dielectric layer 13 of the front panel 10 (baking at a temperature of 540–600° C.). The dielectric glass paste used in forming the dielectric layer 23 uses the same composition as the dielectric glass paste used in forming the dielectric layer 13 of the front panel 10 (excepting that the average particle size of the dielectric glass powder is 0.2–2.5 μm), with 10% by weight of white colored titanium oxide $TiO_2$ having an average particle size of 0.1–0.5 μm added to the composition.

Then, the barrier ribs 24 are formed on the dielectric layer 23 using a screen printing method or a plasma thermal spraying method, so as to have a predetermined pitch (for instance 0.2 mm as a suitable pitch for a 40 inch class PDP). Then, between the barrier ribs 24, phosphor inks of each of the colors red (R), green (G), and blue (B) are applied in the stated order, using a method such as an inkjet method.

Phosphors used in conventional PDPs such as $Y_2O_3:Eu^{3+}$, $Zn_2SiO_4:Mn$, and $BaMgAl_{10}O_{17}:Eu^{2+}$ can be used respectively as the red phosphor, green phosphor and blue phosphor used for the phosphor ink.

Figure 5:
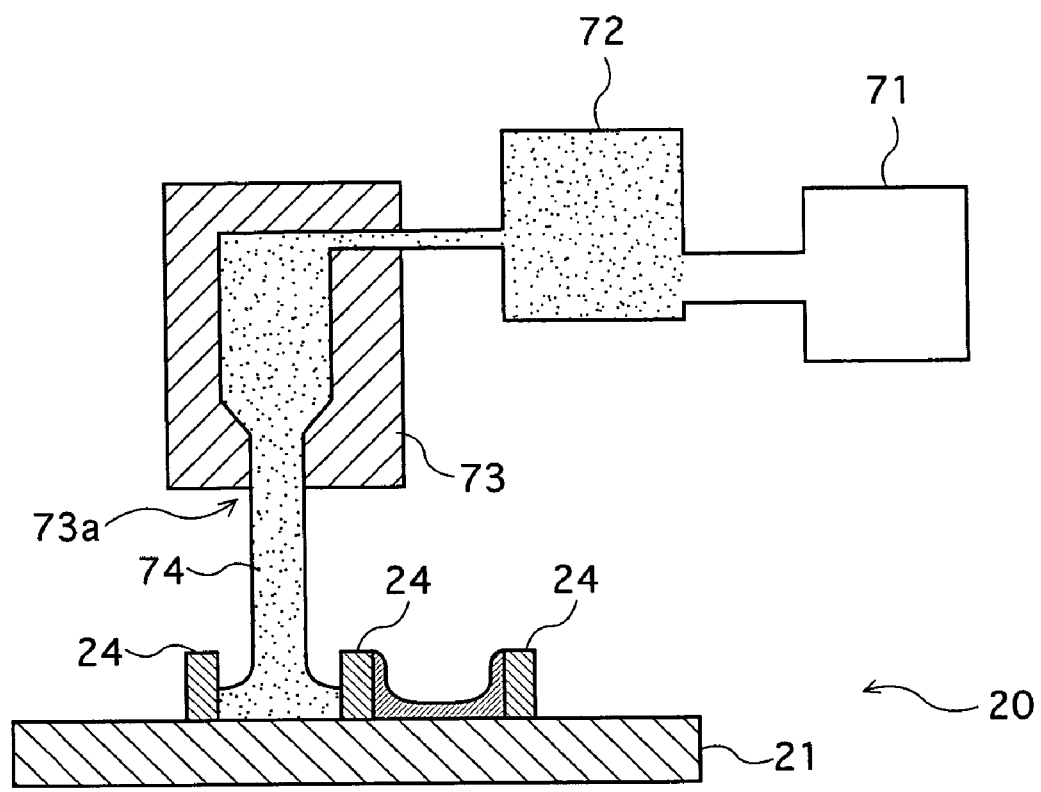
FIG. 5 is an outline sketch of an ink jet apparatus.

FIG. 5 is a schematic drawing showing an inkjet apparatus 70.

As shown in the drawing, the inkjet apparatus includes a server 71 which holds a reserve of phosphor ink paste, a compression pump 72 which applies pressure to the phosphor ink supplied by the server 72, and sends the phosphor ink to a nozzle 73, and the nozzle 73 which emits a jet of the phosphor ink paste sent by the compression pump 72.

When phosphor ink paste such as red phosphor ink paste is to be applied to the back panel 20 between barrier ribs 24, first a liquid mixture consisting of $Y_2O_3:Eu^{3+}$ powder which is the red phosphor within the server 71 (average particle size 2.0 μm) 50% by weight, ethyl cellulose 1% by weight, and a solution which is a liquid mixture of α-turpineol and butyl carbitol 49% by weight is mixed using a sandmill. By this process, a phosphor ink paste having a viscosity of 55 centipoise (CP) is formed. The inkjet apparatus applies pressure to the phosphor ink paste using the pump 72 and sends the paste to the nozzle 73. A jet of the phosphor ink paste sent to the nozzle 73 (60 μm gauge nozzle) is emitted from a nozzle hole 73a. The emitted red phosphor ink paste 74 is applied to the back panel between the barrier ribs 24. During this application, while moving the whole back panel in the lengthwise direction of the barrier ribs, the red phosphor ink paste 74 is applied by the nozzle 73, in a straight line between two adjacent barrier ribs 24. The green and blue phosphor ink pastes can be applied using the same method in which the red phosphor ink paste has been applied, however changing the types of phosphors used. After baking the back panel 20 after red, green and blue color phosphor ink pastes have been applied, at a temperature of 500° C. for 10 minutes, the back panel 20 is formed.

<Binding of Front Panel 10 to Back Panel 20>

After the front panel 10 and the back panel 20 which are formed as described above are positioned facing each other, the peripheries of both panels are sealed together using sealing glass. Here, the discharge space which is between barrier ribs 24 is evacuated to create a vacuum ($1\times10^{-4}$ Pa), and then discharge gas is enclosed in the discharge space with a predetermined pressure, thereby forming the PDP. Here, a conventionally-used Ne—Xe gas is used as the discharge gas, however by using a gas having no less than 5% per volume Xe content with a discharge gas pressure of 66.5–100 kPa, the brightness of the PDP can be improved.

(Experiments)

Next, experiment samples 1–36 of the PDP of the above preferred embodiment, and comparative samples 37–40 were produced, and a comparative investigation of front panel color, brightness, color temperature and the like was performed.

A 42 inch VGA type PDP (having 480 pairs of scan electrodes and sustain electrodes, and 2556 address electrodes) was produced as the PDP for each experiment sample and comparative sample. As the PDP cell size, the height of the barrier ribs was 0.15 mm, the interval between the barrier ribs (cell pitch) was 0.36 mm, and the distance between the display electrodes and sustain electrodes was 0.08 mm. Here, transparent electrodes with silver electrodes attached as bus electrodes were used as display electrodes and sustain electrodes, and silver electrodes were used as address electrodes.

The dielectric layers of both the front panel and the back panel were made of dielectric glass including one or more metal oxides capable of tetravalent ion configuration, as explained in the preferred embodiment. A glass powder having an average particle size of 0.5–2.5 μm was used as the dielectric glass powder in the formation of the dielectric layer, and mixed with a solvent, a plasticizer, and a dispersant to form a dielectric glass paste (20000–50000 centipoise), and the dielectric glass paste was applied using a dyecoat method and baked to form each dielectric layer. The dielectric layers were formed with 25–30 μm thickness. Further, a paste which combined titanium oxide with paste having the same composition as the paste used for the formation of the front panel dielectric layer, was used for the formation of the back panel dielectric layer.

A Ne—Xe gas mixture (Xe content 5% per volume) was used as a discharge gas and enclosed at a pressure of 79.8 kPa (600 torr).

The protective layer for the front panel was formed using a plasma CVD method, with Magnesium Acetylacetone [Mg$(C_5H_7O_2)_2$] or Magnesium Dipivaloyl Methane [Mg$(C_{11}H_{19}O_2)_2$] as a source. In the plasma CVD method, the method used for forming the protective layer was one of, with a vaporizer temperature set at 125° C., and the front panel heating temperature set at 250° C., applying the magnesium source with 300 W of a 13.56 MHz high frequency electric field from a high frequency power source, per period of 20 seconds, while supplying Ar gas and oxygen onto the front panel at rates of 1 L per minute and 2 L per minute respectively, while reducing the pressure to 1.33 kPa (10 torr) By this method, a protective layer consisting of MgO, with thickness 1.0 μm was formed with a film formation speed of 1 μm per minute. The protective layer formed in this way was verified by x-ray analysis to have (100) face orientation, regardless of which source was used.

(1) Experiment Samples 1–8

$P_2O_5$—ZnO—$B_2O_3$—$SiO_2$-$MO_2$-$R_2O$ glass powder which includes a metal oxide capable of tetravalent ion configuration, and was described in the preferred embodiment, was used as the glass powder to form the dielectric layer. Table 1 shows, for each sample, the glass composition, the type of binder and the like used in the dielectric glass paste, and the baking temperature of the dielectric layer and the like.

TABLE 1

| Trial Number | Composition of Dielectric Glass | | | | | | | Amount of glass powder in glass paste (wt %) | Amount of binder in glass paste (wt %) | Amount of dispersant in binder (wt %) | Amount of plasticizer in binder (wt %) | Baking temperature of dielectric glass (° C.) | Film thickness of dielectric glass (μm) | Permittivity of dielectric glass |
|---|---|---|---|---|---|---|---|---|---|---|---|---|---|---|
| | $P_2O_5$ | ZnO | $B_2O_3$ | $SiO_2$ | $Al_2O_3$ | $R_2O$ | $MO_2$ | | | | | | | |
| 1 | 10 | 20 | 50 | 12 | — | $Na_2O$ 5 | $MnO_2$ 3 | 55 | Ethyl cellulose 45 | Homogenol 0.2 | Dibutyl phthalate 2.5 | 550 | 30 | 6.3 |
| 2 | 10 | 25 | 40 | 10 | — | $K_2O$ 5 | $MnO_2$ 10 | 65 | Acrylic 35 | Glycerol mono oleate 0.2 | Dibutyl phthalate 2.5 | 550 | 25 | 6.2 |
| 3 | 25 | 35 | 30 | 7.5 | — | $Li_2O$ 2 | $SnO_2$ 0.5 | 70 | Ethylene oxide 30 | Sorbitan sesquioleate 0.1 | Dioctyl phthalate 3 | 545 | 30 | 6.3 |
| 4 | 20 | 30 | 39.4 | 10 | — | $K_2O$ 0.1 | $MnO_2$ 0.5 | 35 | Ethyl cellulose 65 | Homogenol 0.1 | Dioctyl phthalate 3 | 565 | 25 | 6.3 |
| 5 | 20 | 30 | 30 | 10 | — | $Cs_2O$ 5 | $CeO_2$ 5 | 40 | Ethyl cellulose 60 | Homogenol 0.1 | Glycerine 2 | 553 | 30 | 6.5 |
| 6 | 20 | 34 | 30 | 10 | — | $K_2O$ 5 | $CeO_2$ 1 | 50 | Acrylic 50 | Glycerol mono oleate 0.2 | Dioctyl phthalate 1.5 | 560 | 30 | 6.5 |
| 7 | 20 | 30 | 30 | 10 | — | $Rb_2O$ 5 | $SbO_2$ 5 | 65 | Acrylic 35 | Homogenol 0.1 | — | 554 | 30 | 6.3 |
| 8 | 20 | 30 | 30 | 14.5 | — | $Ag_2O$ 5 | $SbO_2$ 0.5 | 65 | Acrylic 35 | Homogenol 0.1 | — | 559 | 25 | 6.5 |

(2) Experiment Samples 9–16

ZnO—$B_2O_3$—$SiO_2$-$MO_2$-$R_2O$ glass powder, which includes a metal oxide capable of tetravalent ion configuration, and was described in the preferred embodiment, was used as the glass powder to form the dielectric layer. Table 2 shows, for each sample, the glass composition, the type of binder and the like used in the dielectric glass paste, and the baking temperature of the dielectric layer and the like.

TABLE 2

| Trial Number | Composition of dielectric glass | | | | | | | Amount of glass powder in glass paste (wt %) | Amount of binder in glass paste (wt %) | Amount of dispersant in binder (wt %) | Amount of plasticizer in binder (wt %) | Baking temperature of dielectric glass (° C.) | Film thickness of dielectric glass (μm) | Permittivity of dielectric glass |
|---|---|---|---|---|---|---|---|---|---|---|---|---|---|---|
| | $P_2O_5$ | ZnO | $B_2O_3$ | $SiO_2$ | $Al_2O_3$ | $R_2O$ | $MO_2$ | | | | | | | |
| 9 | — | 25 | 55 | 5 | — | $Li_2O$ 5 | $MnO_2$ 10 | 55 | Acrylic 45 | Homogenol 0.2 | Dioctyl phthalate 2 | 540 | 30 | 6.5 |
| 10 | — | 30 | 40 | 15 | — | $K_2O$ 5 | $CeO_2$ 10 | 65 | Acrylic 35 | Glycerol mono oleate 0.2 | Dibutyl phthalate 3 | 545 | 25 | 6.5 |
| 11 | — | 37 | 42.5 | 15 | — | $Na_2O$ 5 | $MnO_2$ 0.5 | 70 | Ethyl cellulose 30 | Sorbitan sesquioleate 0.1 | Dibutyl phthalate 4 | 545 | 25 | 6.5 |
| 12 | — | 44 | 35 | 10 | — | $Cu_2O$ 5 | $SnO_2$ 6 | 40 | Ethyl cellulose 60 | Homogenol 0.2 | Dibutyl phthalate 4 | 545 | 25 | 6.5 |
| 13 | — | 40 | 45 | 10 | — | $Ag_2O$ 2 | $SbO_2$ 3 | 45 | Ethyl cellulose 55 | Homogenol 0.2 | Dibutyl phthalate 4 | 550 | 25 | 6.6 |
| 14 | — | 40 | 50 | 8.5 | — | $K_2O$ 1 | $CeO_2$ 0.5 | 45 | Ethyl cellulose 55 | Homogenol 0.2 | Dibutyl phthalate 4 | 560 | 30 | 6.8 |
| 15 | — | 40 | 40 | 10 | — | $Cs_2O$ 5 | $SnO_2$ 5 | 50 | Ethyl cellulose 50 | Homogenol 0.2 | Dibutyl phthalate 4 | 550 | 30 | 6.5 |
| 16 | — | 35 | 47 | 12.5 | — | $Rb_2O$ 5 | $SbO_2$ 0.5 | 50 | Ethyl cellulose 50 | Homogenol 0.2 | Dibutyl phthalate 4 | 550 | 30 | 6.4 |

(3) Experiment Samples 17–24

$ZnO—B_2O_3—SiO_2—Al_2O_3-MO_2-R_2O$ glass powder which includes a metal oxide capable of tetravalent ion configuration, and was described in the preferred embodiment, was used as the glass powder to form the dielectric layer. Table 3 shows, for each sample, the glass composition, the type of binders and the like used in the dielectric glass paste, and the baking temperature of the dielectric layer and the like.

TABLE 3

| Trial Number | Composition of dielectric glass | | | | | | | Amount of glass powder in glass paste (wt %) | Amount of binder in glass paste (wt %) | Amount of dispersant in binder (wt %) | Amount of plasticizer in binder (wt %) | Baking temperature of dielectric glass (° C.) | Film thickness of dielectric glass (μm) | Permittivity of dielectric glass |
|---|---|---|---|---|---|---|---|---|---|---|---|---|---|---|
| | $P_2O_5$ | ZnO | $B_2O_3$ | $SiO_2$ | $Al_2O_3$ | $R_2O$ | $MO_2$ | | | | | | | |
| 17 | — | 32 | 38 | 15 | 5 | $Ag_2O$ 5 | $MnO_2$ 5 | 55 | Acrylic 45 | Homogenol 0.2 | Dibutyl phthalate 2 | 560 | 30 | 6.4 |
| 18 | — | 40 | 40 | 17 | 1 | $Cu_2O$ 1 | $CeO_2$ 1 | 65 | Acrylic 35 | Homogenol 0.2 | Dibutyl phthalate 2 | 550 | 30 | 6.4 |
| 19 | — | 20 | 55 | 12 | 3 | $Na_2O$ 5 | $SnO_2$ 5 | 70 | Ethyl cellulose 30 | Homogenol 0.2 | Dibutyl phthalate 2 | 555 | 30 | 6.3 |
| 20 | — | 43 | 40 | 5 | 10 | $K_2O$ 1 | $SbO_2$ 1 | 65 | Ethyl cellulose 35 | Homogenol 0.2 | Dibutyl phthalate 2 | 560 | 30 | 6.5 |
| 21 | — | 40 | 45 | 5 | 5 | $Cs_2O$ 5 | $MnO_2$ 0.5 | 65 | Ethyl cellulose 35 | Homogenol 0.2 | Dibutyl phthalate 2 | 565 | 30 | 6.5 |
| 22 | — | 40 | 40 | 9.5 | 5 | $Rb_2O$ 5 | $CeO_2$ 0.5 | 65 | Ethyl cellulose 35 | Homogenol 0.2 | Dibutyl phthalate 2 | 560 | 30 | 6.5 |
| 23 | — | 42 | 43 | 5 | 5 | $K_2O$ 5 | $SbO_2$ 5 | 65 | Ethyl cellulose 35 | Homogenol 0.2 | Dibutyl phthalate 2 | 560 | 30 | 6.5 |
| 24 | — | 32 | 47 | 6 | 10 | $Ag_2O$ 4 | $MnO_2$ 1 | 65 | Ethyl cellulose 35 | Homogenol 0.2 | Dibutyl phthalate 2 | 560 | 30 | 6.4 |

(4) Experiment Samples 25–32

ZnO—$B_2O_3$—$SiO_2$—$Al_2O_3$-$MO_2$-$K_2O$ glass powder which includes a metal oxide capable of tetravalent ion configuration, and was described in the preferred embodiment, was used as the glass powder to form the dielectric layer. Table 4 shows, for each sample, the glass composition, the type of binder and the like used in the dielectric glass paste, and the baking temperature of the dielectric layer and the like.

(5) Experiment Samples 33–36

ZnO—$B_2O_3$—$SiO_2$—$Al_2O_3$-$MO_2$-$Li_2O$ glass powder which includes a metal oxide capable of tetravalent ion configuration, and was described in the preferred embodiment, was used as the glass powder to form the dielectric layer. Table 5 shows, for each sample, the glass composition, the type of binder and the like used in the dielectric glass paste, and the baking temperature of the dielectric layer and the like.

TABLE 4

| Trial Number | Composition of dielectric glass | | | | | | | Amount of glass powder in glass paste (wt %) | Amount of binder in glass paste (wt %) | Amount of dispersant in binder (wt %) | Amount of plasticizer in binder (wt %) | Baking temperature of dielectric glass (° C.) | Film thickness of dielectric glass (µm) | Permittivity of dielectric glass |
|---|---|---|---|---|---|---|---|---|---|---|---|---|---|---|
| | $P_2O_5$ | ZnO | $B_2O_3$ | $SiO_2$ | $Al_2O_3$ | $R_2O$ | $MO_2$ | | | | | | | |
| 25 | — | 15 | 20 | 30 | 20 | $K_2O$ 10 | $MnO_2$ 5 | 55 | Acrylic 45 | Homogenol 0.2 | Dibutyl phthalate 2 | 595 | 30 | 6.7 |
| 26 | — | 19 | 40 | 10 | 25 | $K_2O$ 3 | $CeO_2$ 3 | 60 | Ethyl cellulose 40 | Glyceryl trioleate 0.2 | Dibutyl phthalate 2 | 575 | 30 | 6.4 |
| 27 | — | 10 | 35 | 25 | 20 | $K_2O$ 8 | $SnO_2$ 2 | 60 | Ethyl cellulose 40 | Homogenol 0.2 | Dibutyl phthalate 2 | 580 | 30 | 6.5 |
| 28 | — | 20 | 30 | 30 | 5 | $K_2O$ 10 | $SbO_2$ 5 | 60 | Ethyl cellulose 40 | Homogenol 0.2 | Dibutyl phthalate 2 | 570 | 30 | 6.7 |
| 29 | — | 10.5 | 40 | 25 | 19 | $K_2O$ 5 | $MnO_2$ 0.5 | 70 | Ethyl cellulose 30 | Homogenol 0.2 | Dibutyl phthalate 2 | 585 | 30 | 6.7 |
| 30 | — | 25.5 | 30 | 20 | 20 | $K_2O$ 5 | $SnO_2$ 0.5 | 70 | Ethyl cellulose 30 | Homogenol 0.2 | Dibutyl phthalate 2 | 575 | 30 | 6.7 |
| 31 | — | 21.5 | 30 | 15 | 25 | $K_2O$ 8 | $SbO_2$ 0.5 | 70 | Ethyl cellulose 30 | Homogenol 0.2 | Dibutyl phthalate 2 | 575 | 30 | 6.8 |
| 32 | — | 24.5 | 30 | 15 | 20 | $K_2O$ 10 | $CeO_2$ 0.5 | 70 | Ethyl cellulose 30 | Homogenol 0.2 | Dibutyl phthalate 2 | 575 | 30 | 6.7 |

TABLE 5

| Trial Number | Composition of dielectric glass | | | | | | | Amount of glass powder in glass paste (wt %) | Amount of binder in glass paste (wt %) | Amount of dispersant in binder (wt %) | Amount of plasticizer in binder (wt %) | Baking temperature of dielectric glass (° C.) | Film thickness of dielectric glass (µm) | Permittivity of dielectric glass |
|---|---|---|---|---|---|---|---|---|---|---|---|---|---|---|
| | $P_2O_5$ | ZnO | $B_2O_3$ | $SiO_2$ | $Al_2O_3$ | $R_2O$ | $MO_2$ | | | | | | | |
| 33 | — | 15 | 20 | 30 | 20 | $Li_2O$ 10 | $SnO_2$ 5 | 55 | Acrylic 45 | Homogenol 0.2 | Dioctyl phthalate 2 | 545 | 30 | 6.5 |
| 34 | — | 19 | 40 | 10 | 25 | $Li_2O$ 3 | $SbO_2$ 3 | 35 | Ethyl cellulose 65 | Homogenol 0.1 | Dibutyl phthalate 3 | 565 | 30 | 6.3 |
| 35 | — | 10 | 35 | 25 | 20 | $Li_2O$ 8 | $CeO_2$ 2 | 65 | Ethyl cellulose 35 | Homogenol 0.2 | Dibutyl phthalate 2 | 565 | 30 | 6.3 |
| 36 | — | 19 | 35 | 30 | 5 | $Li_2O$ 10 | $MnO_2$ 1 | 65 | Ethyl cellulose 35 | Homogenol 0.2 | Dibutyl phthalate 2 | 565 | 30 | 6.3 |

(6) Comparative Samples 37–40

ZnO or $P_2O_5$ glass powder which does not include the metal oxide $MO_2$ (M=Mn, Ce, Sn, Sb) capable of tetravalent ion configuration which was described in the preferred embodiment, was used as the glass powder to form the dielectric layer. Table 6 shows, for each sample, the glass composition, the type of binder and the like used in the dielectric glass paste, and the baking temperature of the dielectric layer and the like.

shown in tables 7, 8, 9, 10, 11 and 12 respectively. Note that it in each table a greater a* in a positive direction shows a higher intensity of red, and a greater a* in a negative direction shows a higher intensity of green. A greater b* in a positive direction shows a higher intensity of yellow, and a greater b* in a negative direction shows a higher intensity of blue. Generally, if both a* and b* are in a range of –5–+5, no staining will be visible on the front panel. In particular, because the size of b* influences yellowing, if b* is in the

TABLE 6

| Trial Number | Composition of dielectric glass | | | | | | | Amount of glass powder in glass paste (wt %) | Amount of binder in glass paste (wt %) | Amount of dispersant in binder (wt %) | Amount of plasticizer in binder (wt %) | Baking temperature of dielectric glass (° C.) | Film thickness of dielectric glass (μm) | Permittivity of dielectric glass |
|---|---|---|---|---|---|---|---|---|---|---|---|---|---|---|
| | $P_2O_5$ | ZnO | $B_2O_3$ | $SiO_2$ | $Al_2O_3$ | $R_2O$ | $MO_2$ | | | | | | | |
| 37* | — | 32 | 43 | 15 | 5 | $Ag_2O$ 5 | — | 55 | Acrylic 45 | Homogenol 0.2 | Dibutyl phthalate 2 | 590 | 30 | 6.5 |
| 38* | — | 18 | 20 | 40 | 12 | $Na_2O$ 10 | — | 60 | Ethyl cellulose 40 | Homogenol 0.2 | Dibutyl phthalate 2 | 575 | 30 | 6.3 |
| 39* | — | 25 | 55 | 15 | 5 | — | — | 35 | Ethyl cellulose 65 | Sorbitan sesquioleate 0.2 | Dibutyl phthalate 2 | 575 | 30 | 6.6 |
| 40* | — | 35 | 30 | 17 | 10 | $K_2O$ 8 | — | 40 | Ethyl cellulose 60 | Sorbitan sesquioleate 0.2 | — | 575 | 30 | 6.5 |

Trial numbers 37*~40* are comparative examples

(7) Experiments

Method of Experiments

For each of the experiment samples 1–36 and each of the comparative examples 37–40, the extent of staining of the front panel between the pair of scan electrodes and pair of sustain electrodes was determined using a colorimeter (Nippon Denshoku Industries (Co., Ltd) NF777). An a* and a b* value, which both indicate the extent of staining of the glass were items to be determined, and were determined based on the color difference display method stipulated in JISZ8730.

Further, when causing each PDP sample to display all white, as well as measuring brightness, color temperature was determined using a multi-channel spectrometer (Otsuka Electronics Co., Ltd MCPD-7000). When the PDP screen is caused to display all white, a discharge sustain pulse, with a 180 V voltage, and 50 kHz frequency, which does not usually cause dielectric breakdown, is applied to the PDP.

Further, in each of samples 1–40, the permittivity of the front panel dielectric layer is determined before the panels are sealed together. To determine permittivity, silver paste was applied to the front panel dielectric layer and dried and used as one electrode, an address electrode was used as the other electrode, and an LCR meter was used to measure permittivity between the electrodes. The determined permittivity results are given in Tables 1–6.

(8) Results and Consideration

Each determined result for experiment samples 1–8, 9–16, 17–24, 25–32, 33–36, and comparative samples 37–40 are range of –5–+5, yellowing will not be visible, however when b* exceeds +10, yellowing becomes noticeable.

TABLE 7

| Trial Number | Values determined by Colorimeter | | Panel brightness (cd/m²) | Panel color temperature (K) |
|---|---|---|---|---|
| | a* | b* | | |
| 1 | −0.3 | 1.0 | 550 | 9110 |
| 2 | 1.2 | 0.8 | 552 | 9250 |
| 3 | −1.5 | 1.8 | 541 | 9003 |
| 4 | −0.8 | 1.2 | 540 | 9102 |
| 5 | −1.3 | 1.0 | 542 | 9125 |
| 6 | −1.5 | 1.3 | 547 | 9085 |
| 7 | −1.2 | 1.4 | 537 | 9050 |
| 8 | −1.8 | 2.0 | 540 | 8900 |

TABLE 8

| Trial Number | Values determined by Colorimeter | | Panel brightness (cd/m²) | Panel color temperature (K) |
|---|---|---|---|---|
| | a* | b* | | |
| 9 | −0.2 | 0.5 | 560 | 9326 |
| 10 | −1.8 | 1.3 | 554 | 9015 |
| 11 | −1 | 1.2 | 545 | 9102 |
| 12 | −1.9 | 1.0 | 538 | 9118 |
| 13 | −1.5 | 1.2 | 540 | 9108 |
| 14 | −1.8 | 1.6 | 552 | 9062 |
| 15 | −1.3 | 1.2 | 548 | 9125 |
| 16 | −1.7 | 2.0 | 545 | 8950 |

TABLE 9

| Trial | Values determined by Colorimeter | | Panel brightness | Panel color temperature |
|---|---|---|---|---|
| Number | a* | b* | (cd/m²) | (K) |
| 17 | −0.8 | 0.9 | 520 | 9200 |
| 18 | −1.3 | 1.2 | 505 | 9150 |
| 19 | −1.5 | 1.0 | 510 | 9170 |
| 20 | −1.6 | 1.3 | 522 | 9100 |
| 21 | −1.1 | 1.4 | 538 | 9045 |
| 22 | −1.8 | 1.9 | 542 | 8960 |
| 23 | −1.5 | 1.3 | 526 | 9110 |
| 24 | −1.2 | 1.2 | 525 | 9125 |

TABLE 10

| Trial | Values determined by Colorimeter | | Panel brightness | Panel color temperature |
|---|---|---|---|---|
| Number | a* | b* | (cd/m²) | (K) |
| 25 | −0.5 | 0.6 | 550 | 9280 |
| 26 | −1.3 | 1.5 | 554 | 9020 |
| 27 | −1.6 | 1.7 | 545 | 9001 |
| 28 | −1.4 | 1.3 | 553 | 9136 |
| 29 | −1.2 | 1.4 | 532 | 9087 |
| 30 | −1.8 | 2.0 | 527 | 8905 |
| 31 | −1.9 | 2.0 | 534 | 8900 |
| 32 | −1.7 | 2.0 | 550 | 8903 |

TABLE 11

| Trial | Values determined by Colorimeter | | Panel brightness | Panel color temperature |
|---|---|---|---|---|
| Number | a* | b* | (cd/m²) | (K) |
| 33 | −1.8 | 1.6 | 560 | 9001 |
| 34 | −1.7 | 1.5 | 558 | 9053 |
| 35 | −1.3 | 1.6 | 550 | 9047 |
| 36 | −1.3 | 1.2 | 546 | 9125 |

TABLE 12

| Trial | Values determined by Colorimeter | | Panel brightness | Panel color temperature |
|---|---|---|---|---|
| Number | a* | b* | (cd/m²) | (K) |
| 37* | −1.5 | 5.1 | 500 | 7600 |
| 38* | −1.5 | 6.2 | 495 | 7580 |
| 39* | −1.9 | 6.5 | 498 | 7540 |
| 40* | −2.0 | 7.0 | 496 | 7430 |

Trial Numbers 37*~40* are comparative samples

As shown in table 7, in PDPs provided with a dielectric layer consisting of $P_2O_5$—ZnO—$B_2O_3$—$SiO_2$-$MO_2$-$R_2O$ glass which includes the metal oxide $MO_2$ capable of trivalent or tetravalent ion configuration, b* which indicates yellowing, is 0.8–2.0. It can be seen that b* is kept low here, in comparison with b* (5.1–7.0) in comparative samples 37–40 shown in table 12. In particular, it is verified that the problem of yellowing is clearly improved in the dielectric layer of table 7, even when comparing the experiment sample 1 and comparative sample 38, which have the same composition as each other except for the presence of $MnO_2$ in the dielectric layer.

Further, regarding PDP brightness, experiment samples 1–8 show a brightness of no less than 537 cd/m² which is greater than the brightness of no more than 500 cd/m² of the comparative samples 37–40. This is considered to be because the formation of colloid, which reflects light, is restricted, even if silver has diffused into the dielectric layer. In addition, in the present experiment samples 1–8, the panel color temperature is satisfactory as it is not a color temperature at which yellowing will occur.

It can also be seen that, in the PDP provided with a dielectric layer made of ZnO—$B_2O_3$—$SiO_2$-$MO_2$-$R_2O$ glass, which is shown in table 8, b* which indicates yellowing is kept low in comparison with b* in the comparative samples 37–40, at 0.5–2.0. In particular, it is verified that the problem of yellowing is clearly improved in the dielectric layer of table 8, even when comparing the experiment sample 9 (b*=0.5) and comparative sample 39 (b*=6.5), which have the same composition as each other except for the presence of $MnO_2$ in the dielectric layer.

Further, regarding PDP brightness, experiment samples 9–16 show a higher brightness, of no less than 538 cd/m², than the brightness of no more than 500 cd/m² of the comparative samples 37–40. In addition, in the present experiment samples 9–16, the panel color temperature is preferable in comparison with that of the comparative samples 37–40.

It can also be seen that, in the PDP provided with the dielectric layer made of ZnO—$B_2O_3$—$SiO_2$—$Al_2O_3$-$MO_2$-$R_2O$ glass, which is shown in table 9, b* which indicates yellowing is 0.9–1.9, which, similarly to the previously mentioned glass, is kept low in comparison with b* in the comparative samples 37–40. In particular, it is verified that the problem of yellowing is clearly improved in the dielectric layer of table 9, even when comparing the experiment sample 17 (b*=0.9) and experiment sample 24 (b*=1.2) with comparative sample 37 (b*=7.0) which have the same composition as each other except for the presence of $MnO_2$ in the dielectric layer.

Further, regarding PDP brightness, experiment samples 17–24 show a higher brightness, of no less than 510 cd/m², than the brightness of no more than 500 cd/m² of the comparative samples 37–40. In addition, in the present experiment samples 17–24, the panel color temperature is preferable in comparison with that of the comparative samples 37–40.

It can also be seen that, in the PDPs provided with the dielectric layer made of ZnO—$B_2O_3$—$SiO_2$—$Al_2O_3$-$MO_2$-$K_2O$ glass, which is shown in table 10, b* which indicates yellowing is 0.6–2.0, which, similarly to the previously mentioned glass, is kept low in comparison with b* in the comparative samples 37–40. In particular, it is verified that the problem of yellowing is clearly improved in the dielectric layer of table 10, even when comparing the experiment samples of table 10 and comparative sample 40 (b*=7.0) which have the same composition except for the presence of $MnO_2$ in the dielectric layer.

Further, regarding PDP brightness, experiment samples 25–32 show a higher brightness, of no less than 527 cd/m², than the brightness of no more than 500 cd/m² of the comparative samples 37–40. In addition, in the present experiment samples 25–32, the panel color temperature is preferable in comparison with that of the comparative samples 37–40.

It can also be seen that, in the PDPs provided with the dielectric layer made of ZnO—$B_2O_3$—$SiO_2$—$Al_2O_3$-$MO_2$-$Li_2O$ glass, which is shown in table 11, b* which indicates yellowing is 1.2–1.6, which, similarly to the previously mentioned glass, is kept low in comparison with b* in the comparative samples 37–40.

Further, regarding PDP brightness, experiment samples 33–36 show a higher brightness, of no less than 546 cd/m$^2$, than the brightness of no more than 500 cd/m$^2$ of the comparative samples 37–40. In addition, in the present experiment samples 25–32, the panel color temperature is preferable in comparison with that of the comparative samples 37–40.

INDUSTRIAL APPLICABILITY

The plasma display panel of the present invention, and production method thereof, is particularly effective for a plasma display panel provided with a dielectric layer made of glass that has a low melting point.

The invention claimed is:

1. A plasma display panel comprising metal electrodes and a dielectric layer which covers the metal electrodes, the dielectric layer being composed of glass formed from zinc oxide, boron oxide, silicon oxide, R$_2$O and MO$_2$, wherein
the R$_2$O is one material selected from a group consisting of lithium oxide, sodium oxide, potassium oxide, rubidium oxide, cesium oxide, copper oxide and silver oxide, and MO$_2$ is manganese oxide.

2. The plasma display panel of claim 1, wherein
a composition ratio of the glass is zinc oxide: 25–44% by weight, boron oxide: 35–55% by weight, silicon oxide: 5–15% by weight, R$_2$O: 1–5% by weight, and MO$_2$: 0.5%–10% by weight.

3. The plasma display panel of claim 2 wherein the metal electrodes are silver electrodes or electrodes formed from chrome/copper/chrome layers.

4. The plasma display panel of claim 1 wherein
the glass further includes aluminum oxide.

5. The plasma display panel of claim 4 wherein
a composition ratio of the glass is zinc oxide: 20–43% by weight, boron oxide: 38–55% by weight, silicon oxide: 5–17% by weight, aluminum oxide 1–10% by weight, R$_2$O: 1–5% by weight, and MO$_2$: 0.5%–5% by weight.

6. The plasma display panel of claim 5 wherein the metal electrodes are silver electrodes or electrodes formed from chrome/copper/chrome layers.

7. The plasma display panel of claim 4 wherein
the R$_2$O is potassium oxide, and the composition ratio of the glass is zinc oxide: 10–25.5% by weight, boron oxide: 20–40% by weight, silicon oxide: 10–30% by weight, aluminum oxide: 5–25% by weight, potassium oxide: 3–10% by weight, and MO$_2$: 0.5–5% by weight.

8. The plasma display panel of claim 7 wherein the metal electrodes are silver electrodes or electrodes formed from chrome/copper/chrome layers.

9. The plasma display panel of claim 4 wherein
the R$_2$O is lithium oxide, and a composition ratio of the glass is zinc oxide: 10–19% by weight, boron oxide: 20–40% by weight, silicon oxide: 10–30% by weight, aluminum oxide: 5–25% by weight, lithium oxide: 3–10% by weight, and MO$_2$: 1–5% by weight.

10. The plasma display panel of claim 9 wherein the metal electrodes are silver electrodes or electrodes formed from chrome/copper/chrome layers.

11. The plasma display panel of claim 4 wherein the metal electrodes are silver electrodes or electrodes formed from chrome/copper/chrome layers.

12. The plasma display panel of claim 1 wherein
the glass further includes phosphorus (V) oxide.

13. The plasma display panel of claim 12 wherein
a composition ratio of the glass is zinc oxide: 20–35% by weight, boron oxide: 30–55% by weight, silicon oxide: 5–12% by weight, phosphorus (V) oxide: 15–25%, R$_2$O: 0.1–5% by weight, and MO$_2$: 0.5–10% by weight.

14. The plasma display panel of claim 13 wherein the metal electrodes are silver electrodes or electrodes formed from chrome/copper/chrome layers.

15. The plasma display panel of claim 12 wherein the metal electrodes are silver electrodes or electrodes formed from chrome/copper/chrome layers.

16. The plasma display panel of any claim 1 wherein the metal electrodes are silver electrodes or electrodes formed from chrome/copper/chrome layers.

17. A plasma display panel comprising metal electrodes and a dielectric layer which covers the metal electrodes, the dielectric layer being composed from a ZnO—B$_2$O$_3$—SiO$_2$—Al$_2$O$_3$—R$_2$O glass, a P$_2$O$_5$—ZnO—B$_2$O$_3$—SiO$_2$—R$_2$O glass, or a ZnO—B$_2$O$_3$—SiO$_2$-MO$_2$-R$_2$O glass,
the glass including 0.5–5% by weight of metal oxide MO$_2$ which is capable of trivalent or tetravalent ion configuration in glass, no more than 10% by weight of R$_2$O, and not including PbO or B$_2$O$_3$, wherein
the R$_2$O is one material selected from the group consisting of lithium oxide, sodium oxide, potassium oxide, rubidium oxide, cesium oxide, copper oxide and silver oxide, and MO$_2$ is oxide.

18. The plasma display panel of claim 17 wherein the metal electrodes are silver electrodes or electrodes formed from chrome/copper/chrome layers.

19. A plasma display panel production method including a process of applying dielectric glass powder onto metal electrodes and baking the applied dielectric glass powder, thereby covering the metal electrodes with a dielectric layer, the dielectric glass powder including zinc oxide, boron oxide, silicon oxide, R$_2$O, and MO$_2$, wherein
the R$_2$O is one material selected from the group consisting of lithium oxide, sodium oxide, potassium oxide, rubidium oxide, cesium oxide, copper oxide and silver oxide, and MO$_2$ is manganese (IV) oxide.

20. The plasma display panel production method of claim 19, wherein
a composition of the dielectric glass powder is zinc oxide: 25–44% by weight, boron oxide: 35–55% by weight, silicon oxide: 5–15% by weight, R$_2$O: 1–5% by weight, and MO$_2$ 0.5–10% by weight.

21. The plasma display panel production method of claim 19, wherein
the dielectric glass powder further includes aluminum oxide, and a composition ratio of the dielectric glass is zinc oxide: 20–43% by weight, boron oxide: 38–55% by weight, silicon oxide: 5–17% by weight, aluminum oxide: 1–10% by weight, R$_2$O: 1–5% by weight, and MO$_2$: 0.2–5% by weight.

22. The plasma display panel production method of claim 19, wherein the dielectric glass powder further includes phosphorus (V) oxide, and a composition ratio of the dielectric glass is zinc oxide: 20–35% by weight, boron oxide: 30–55% by weight, silicon oxide: 5–12% by weight, phosphorus (V) oxide: 15–25% by weight, R$_2$O: 0.1–5% by weight, and MO$_2$: 0.5–10% by weight.

* * * * *

UNITED STATES PATENT AND TRADEMARK OFFICE
CERTIFICATE OF CORRECTION

PATENT NO. : 7,057,342 B2
APPLICATION NO. : 10/481801
DATED : June 6, 2006
INVENTOR(S) : Aoki et al.

It is certified that error appears in the above-identified patent and that said Letters Patent is hereby corrected as shown below:

IN THE CLAIMS

Claim 1, Column 21, line 23, "$MO_2$ is manganese oxide" should read --$MO_2$ is manganese (IV) oxide--

Claim 17, Column 22, line 27, "$MO_2$ is manganese oxide" should read --$MO_2$ is manganese (IV) oxide--

Signed and Sealed this

Seventh Day of July, 2009

JOHN DOLL
*Acting Director of the United States Patent and Trademark Office*